United States Patent

Tomota et al.

[15] 3,691,830
[45] Sept. 19, 1972

[54] CURRENT METER OR FLOW METER

[72] Inventors: Miyaji Tomota; Yutaka Ishikawa; Hiroo Yamasaki; Yoshio Kurita, all of Tokyo, Japan

[73] Assignee: Kabushikikaisha Yokogawa Denki Seisakusho (Yokogawa Electric Works, Ltd.), Tokyo, Japan

[22] Filed: July 7, 1970

[21] Appl. No.: 52,967

[30] Foreign Application Priority Data

July 18, 1969 Japan ............... 45/56885
Jan. 30, 1970 Japan ............... 45/8198
Jan. 30, 1970 Japan ............... 45/8197
Jan. 30, 1970 Japan ............... 45/8195

[52] U.S. Cl. .................................. 73/194 B
[51] Int. Cl. .................................. G01f 1/00
[58] Field of Search ............ 73/194 B, 194 C, 212

[56] References Cited

UNITED STATES PATENTS

| | | |
|---|---|---|
| 2,813,424 | 11/1957 | Liepmann et al. .......73/194 B |
| 3,116,639 | 1/1964 | Bird ....................73/194 B |
| 3,564,915 | 2/1971 | Tomota et al. ..........73/194 C |
| 3,422,682 | 1/1969 | Evans et al. ..............73/212 |

OTHER PUBLICATIONS

Sharpsteen, " Fluid Amplifier Measures Flow Velocity", Control Engineering, Jan. 1966. p. 103.

*Primary Examiner*—Charles A. Ruehl
*Attorney*—Hill, Sherman, Meroni, Gross & Simpson

[57] ABSTRACT

A flow meter in which a cylindrical device is immersed in the fluid stream and produces Karman vortices and in which tubes pass through the cylindrical device and supply a quantity of fluid which varies as a function of the pressure on the surface of the cylindrical device and wherein a velocity measuring means is mounted in one of the tubes to detect the flow through the tube.

15 Claims, 26 Drawing Figures

INVENTORS
Miyaji Tomota, Yutaka Ishikawa,
Hiroo Yamasaki & Yoshio Kurita.

INVENTORS
Miyaji Tomota, Yutaka Ishikawa,
Hiroo Yamasaki & Yoshio Kurita.

CURRENT METER OR FLOW METER

BACKGROUND OF THE INVENTION

1. Field of the Invention

The present invention relates to a current meter or flow meter, and more particularly to a current meter or flow meter utilizing Karman vortices.

2. Description of the Prior Art

Figure 1:
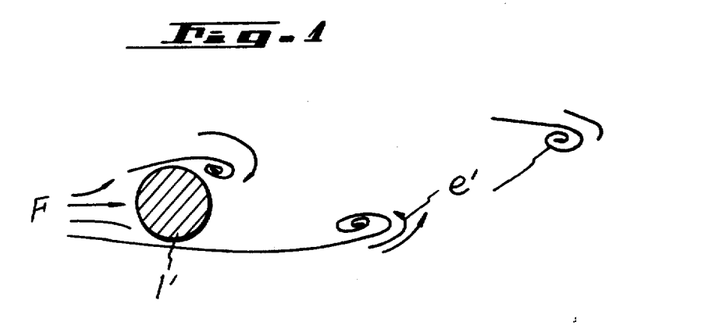
FIG. 1 shows formation of Karman vortices.

It is well known in the art that when such an object 1', for example, a cylinder with circular cross-section is immersed in a fluid stream F as shown in FIG. 1, that inward-spinning vortices e' are generated alternately on both sides behind the object 1' at regular intervals and alternately, which vortices e' shed or separate from the object 1' in two staggered-parallel rows and are carried downstream. These asymmetric rows of the vortices e' are commonly referred to as the Karman vortex street in the art and is a phenomenon which has long been studied. The growth and shedding cycle of the wake flow pattern comprises a staggered trail of vortices.

It is also well known in the art that these vortices are shed downstream at a frequency determined by the flow velocity or flow rate.

The number of Karman vortices formed per unit time is designated $f$ and is expressed by the following equation.

$$f = K(V/D)$$

where $V$ represents the flow velocity of the fluid $F$, $D$ the diameter of the cylindrical object 1' and $K$ is a constant.

It will be, therefore, apparent that the flow velocity of the fluid or the quantity of flow (flow rate) can be obtained by measuring $f$.

SUMMARY OF THE INVENTION

One object of the present invention is to provide a current meter or flow meter which can accurately measure the number of Karman vortices formed even if the fluid is contaminated, contains dusts or solid particles.

Another object of the present invention is to provide a current meter or flow meter in which the detecting elements may be easily repaired or replaced.

Still another object of the present invention is to provide a simple and compact current or flow meter.

Other objects, features and advantages of the present invention will become apparent from the following description taken in conjunction with the accompanying drawings, wherein like reference numerals throughout the various views of the drawings are intended to designate similar elements or components.

DESCRIPTION OF THE PREFERRED EMBODIMENTS

Figures 2A, 2B:
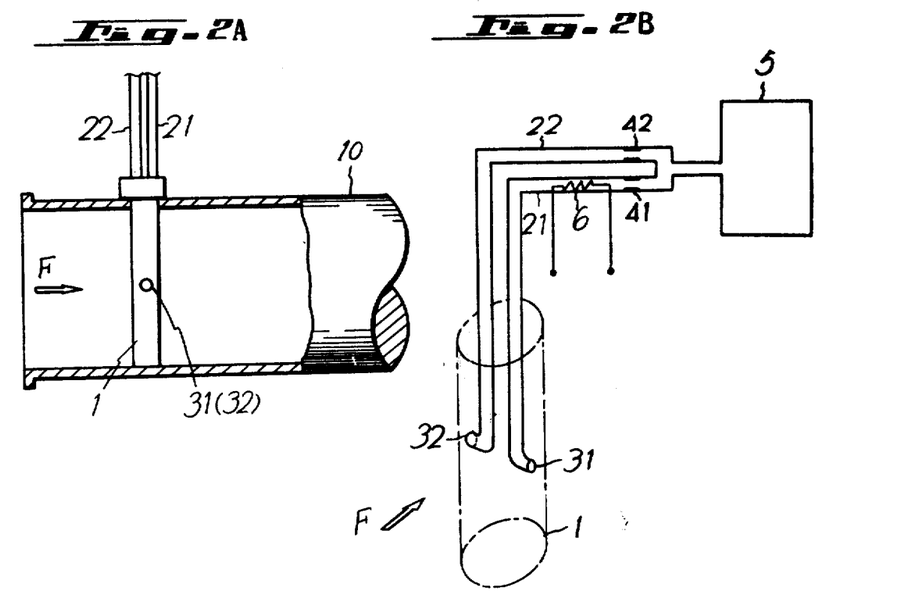
FIGS. 2A and 2B are schematic diagrams showing one example of the present invention.

FIGS. 2A and 2B show one embodiment of the present invention. Reference numeral 1 indicates a cylindrical object for producing the Karman vortex. In this example the object 1 has a circular cross-section. Reference numerals 21 and 22 are pipes or tubes of small diameter which have end portions that extend into the cylindrical object 1 and open on opposite sides thereof at 31, 32. These openings or ports 31, 32 of the pipes 21, 22 are used to supply fluid from reservoir 5 through the pipes 21, 22 in accordance with pressure variation of the fluid F near the openings 31, 32. These pressure variations are caused by the vortices produced. The pipes 21, 22 are used for supplying a fluid for purging or cleaning the surface of the cylindrical object 1. Reference numerals 41, 42 designate restrictors mounted in the pipes 21, 22, respectively. A purge fluid source 5 is connected to the other ends of the pipes 21, 22 and supplies purge fluid to the pipes 21, 22 at a substantially constant pressure. A fluid displacement detecting element 6 such, for example, as a hot wire is constructed so as not to obstruct the displacement of the fluid and is mounted in the pipe 21 to detect the variations of the velocity or quantity of the flow of the fluid.

Figure 3A:
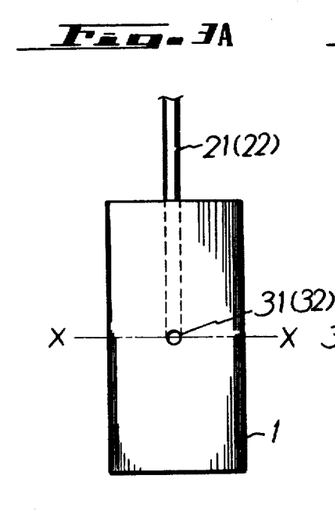
FIG. 3A is a side view of the cylindrical object employed in the example of the present invention depicted in FIGS. 2A and 2B.
Figure 3B:
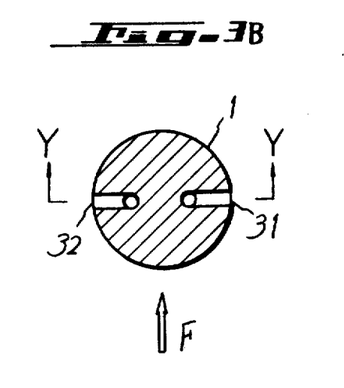
FIG. 3B is a cross-sectional view along the line X—X in FIG. 3A.
Figure 3C:
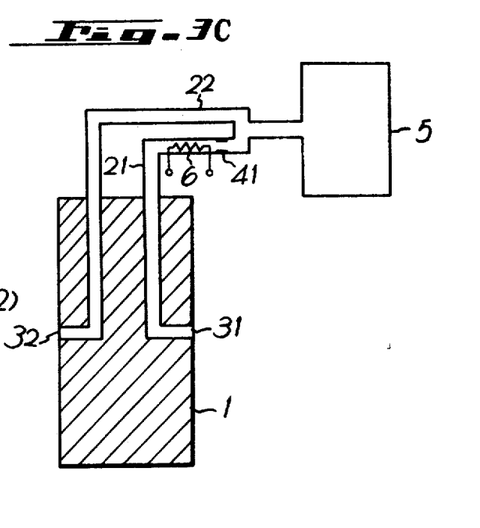
FIG. 3C is a cross-sectional view along the line Y—Y in FIG. 3B.

FIGS. 3A, 3B and 3C illustrate the cylindrical object 1 depicted in FIGS. 2A, 2B on an enlarged scale. As shown in these figures the pipes 21, 22 through which the purge fluid flows are introduced into the cylindrical object 1 and open at ports 31, 32 on opposite surfaces of the cylindrical object 1 at approximately its midpoint. The openings 31, 32 open on an axis at right angles to the fluid stream, so that the purge fluid supplied from the purge fluid source 5 purges or cleans the surface of the cylindrical object 1 near the openings.

Figure 4:
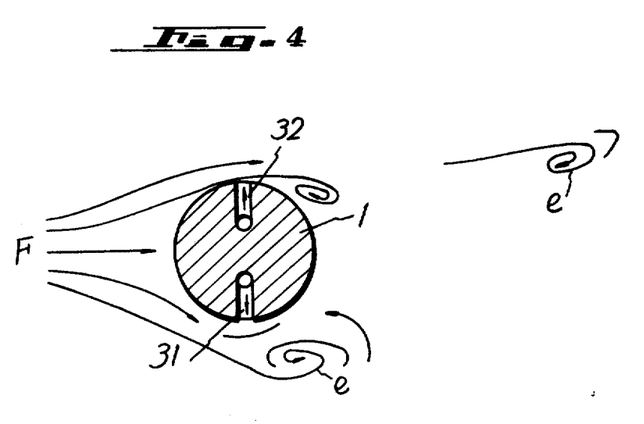
FIG. 4 is a schematic diagram for explaining the operation of the embodiment shown in FIG. 2.

When the cylindrical object 1 is immersed in the fluid stream F flowing through a conduit 10 in such a manner that the longitudinal axis of the cylindrical object 1 and the line connecting the opennings 31 and 32 are both perpendicular to the flow direction of the fluid F, vortices will be alternately produced behind the cylindrical object 1 at regular intervals based upon the theory of formation of the vortex described above. When the vortex is produced the flow velocity of the fluid along the surface of the cylindrical object 1 changes and the pressures of the fluid on opposite sides of the cylindrical object 1 vary in accordance with the formation of the vortices and their separation from the cylindrical object 1. The purge fluid from the purge fluid source 5 passes through the pipes 21, 22 and out of the openings 31, 32 to purge or clean the surface of the cylindrical object 1. The quantity of the flow of the purge fluid which flows out of the openings 31, 32 changes with the pressure of the fluid F near the openings 31, 32. As shown in FIG. 4, immediately after a vortex $e$ is produced near the opening 31 and a vortex separates from the cylindrical object 1 near the other opening 32, the velocity of the fluid flowing along the surface of the cylindrical object 1 becomes higher on the side of the cylindrical object 1 near opening 32, and the pressure of the fluid F on the surface of the cylindrical object 1 in the vicinity of the opening 32 becomes smaller which increases the amount of purge fluid supplied from the opening 32. On the other hand, the flow velocity of the fluid F on the side of the cylindrical object 1 adjacent the opening 31 becomes lower and the pressure of the fluid F exerted on the cylindrical object 1 in the vicinity of the opening 31 becomes higher which decreases the amount of purge fluid supplied from the opening 31. Thus, the amount of the purge fluid supplied from openings 31 and 32 varies in accordance with the number of vortices produced on the opposite sides of the cylindrical object 1. The variation in the quantity of the purge fluid jetted from the openings 31, 32 causes variations in the flow velocity of the purge fluid past the restrictors 41, 42 mounted in pipes 21, 22 and thus the number of vortices produced near the opening 37 can be measured by detecting the variation of the velocity or quantity of the purge fluid flowing through the pipe 21, with, for example, a hot wire 6. The electrical signal obtained from the element 6 is proportional to the variations of the velocity or quantity of the purge fluid and is supplied to a suitable meter (not shown).

With the above arrangement because the purge fluid is always ejected from both sides of the cylindrical object 1, solid particles and/or dust will not adhere to the surface of the cylindrical object and the formation, growth and separation of the Karman vortices will be assured. Further, the fluid displacement detecting element 6 is disposed in the pipe 21 and detects the variations of the velocity or quantity of the flow of the purge fluid which is not contaminated and the element 6 is not directly in contact with the fluid F whose velocity is to be measured. Thus, even if the fluid to be measured is a contaminated gas, the number of vortices can still be accurately detected.

Also, since the detecting element 6 is located in the portion of the pipe outside of the cylindrical object 1, it is very easy to repair or exchange it.

Figure 5:
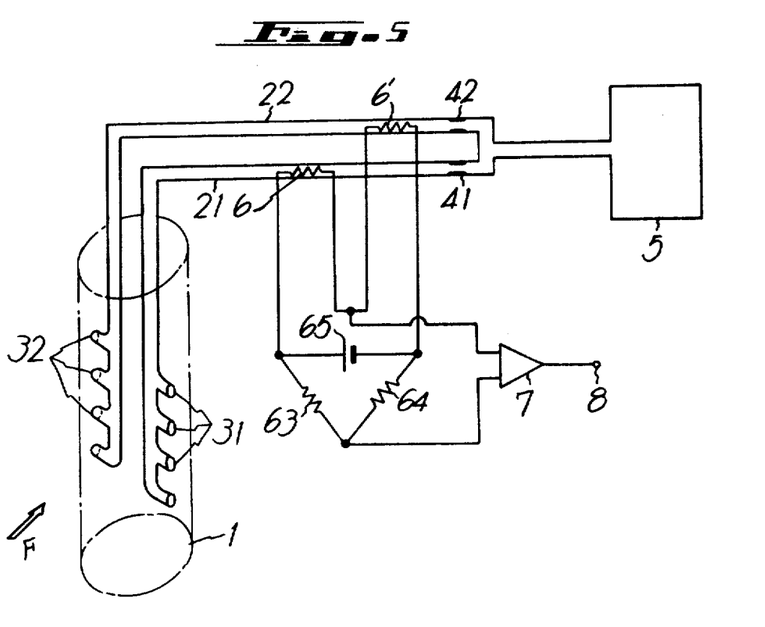
FIG. 5 is a schematic diagram illustrating another example of the present invention.

FIG. 5 shows a modified form of the present invention. The same reference numerals as used in the foregoing examples designate like elements. Reference numeral 1 indicates the cylindrical object for producing the Karman vortex, 21 and 22 indicate the pipes or tubes of small diameter which supply the purge fluid, a plurality of openings 31, 32 are formed in longitudinal rows in tubes 21 and 22 and open on the opposite sides of the cylindrical object 1; 41 and 42 are restrictors mounted in tubes 21 and 22; 5 is the purge fluid source for feeding purge fluid of substantially constant pressure to the tubes 21, 22; and, 6 and 6' are fluid displacement detecting elements mounted in tubes 21, 22 for detecting the variations of the velocity or quantity of the purge fluid in tubes 21, 22. Reference numerals 63, 64 are resistors connected in series and 65 is a DC power source inserted between the free ends of the resistors 63 and 64. The elements 6 and 6' are connected in series and their free ends are respectively connected to opposite terminals of the DC power source 65, whereby the elements 6, 6' and the resistors 63, 64 form a bridge circuit. The DC power source 65 is connected across the bridge and the amplifier 7 is connected across the bridge. The amplifier is connected to output terminal 8.

In FIG. 5 the plurality of openings 31 and 32, open on the opposite sides of the cylindrical object 1 along its axial direction and the purge fluid from the purge source 5 is ejected uniformly from the cylindrical object 1 along the axial direction of the member 1. As a result dust or solid particles are positively and effectively prevented from sticking on the surface of the cylindrical object 1.

Also, the velocity or quantity of the purge fluid flowing through the tubes 21, 22 varies with the variations of the pressure of fluid F caused by the vortices alternately produced on both sides of the cylindrical object 1 and output signals indicative of the number of vortices formed can be obtained at the output terminals of the bridge circuit because the resistance values of the elements 6 and 6' vary in accordance with the variations of the velocity or quantity of the flow of the purge fluid flowing through the tubes 21, 22.

Figure 6A:
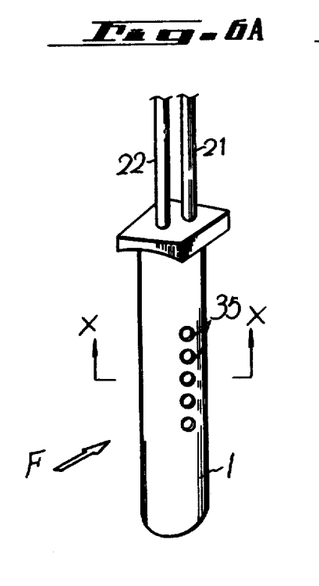
FIG. 6A is a perspective view illustrating another modification of the cylindrical object usable in the present invention.
Figure 6B:
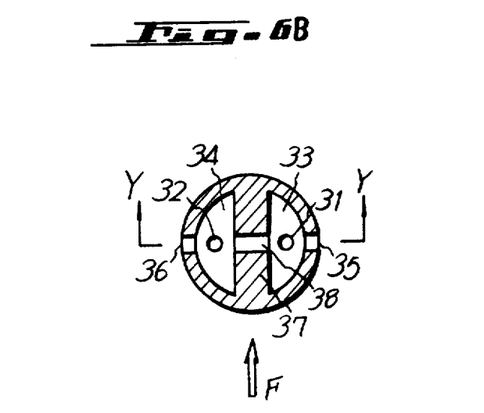
FIG. 6B is a cross-sectional view along the line X—X in FIG. 6A.
Figure 6C:
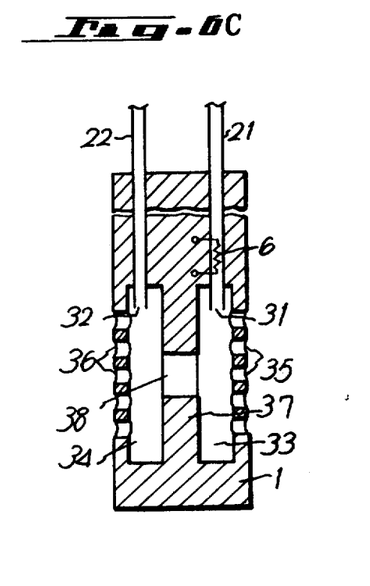
FIG. 6C is a cross-sectional view along the line Y—Y in FIG. 6B.

FIGS. 6A, 6B and 6C show a modified form of the cylindrical object. In these figures reference numerals similar to those in the foregoing examples indicate similar elements. In FIGS. 6A to 6C, the openings 31, 32 of the tubes 21, 22 terminate in cavities 33, 34 formed in the cylindrical object 1. Reference numerals 35 and 36, respectively, indicate a plurality of openings which are formed in the cylindrical object 1 on opposite sides thereof in its axial direction. The openings 35, 36 intercommunicate with the cavities 33, 34 and introduce the fluid F into the cavities 33, 34 as a function of the pressure variations of the fluid F caused by formation of the Karman vortices. Reference numeral 37 represents a partition wall provided in the cylindrical object 1 between the cavities 33 and 34 and an aperture 38 is formed through the partition wall 37 so that the cavities communicate with each other. One of the tubes 21 or 22 has mounted therein the purge fluid displacement detecting element 6.

If the cylindrical object 1 of FIGS. 6A to 6C is immersed in the fluid F in such a manner that the longitudinal axis of the cylindrical object 1 is substantially perpendicular to the flow direction of the fluid F and a line connecting the openings 35 and 36 is also approximately perpendicular to the flow direction of the fluid F, the fluid passing into the cavities 33, 34 through the openings 35, 36 will flow through the openings 35, 36, the cavities 33, 34 and the aperture 38 in accordance with the variations of the pressure of the fluid caused by formation of the vortices near the openings 35, 36 or their separation therefrom. The purge fluid ejected from the openings 31, 32 of the tubes 21, 22 into the cavities 33, 34 purges and cleans the cavities 33, 34 and the openings 35, 36 and then is ejected to the outside of the cylindrical object 1. When the fluid in the cavities 33, 34 is displaced due to the formation of the vortices or their separation, the fluid pressure in the cavities 33, 34 varies accordingly. Consequently the quantity of the purge fluid ejected from the openings 31, 32 of the tubes 21, 22 into the cavities 33, 34 varies according to the pressure variations in the cavities 33, 34. Therefore, the number of vortices formed can be obtained by detecting the variations of the quantity or velocity of the flow of the purge fluid in the tube 21 with the detecting element 6 disposed therein.

With this cylindrical object suction and emission of fluid occurs at the openings 35, 36 in response to the formation of the vortices and/or its separation from the cylindrical object and the formation of the vortices can be controlled by the suction and emission of the fluid. Thus, the formation of the vortices can be further stabilized so that fluctuations of the fluid and vortices other than the Karman vortex in the fluid will not introduce errors. In general, when the boundary layer of the fluid along the surface of an object with circular cross-section is ready to separate from the surface of the object, such separation will be enhanced if fluid is ejected from the surface of the object near the separation point, while the separation of the boundary layer is delayed if suction of fluid occurs near that point.

Figure 7A:
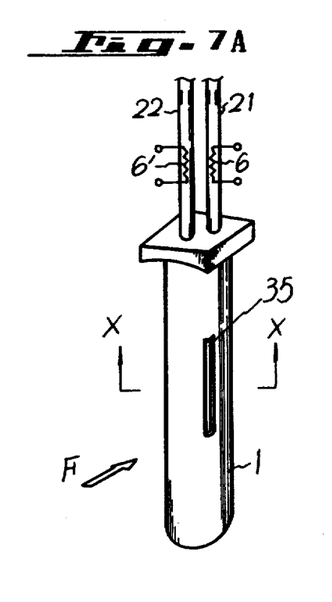
FIGS. 7A, 7B, 7C and 8A, 8B, 8C respectively show further modifications of the cylindrical object usable in the present invention similar to that of FIGS. 6A, 6B and 6C.
Figure 7B:
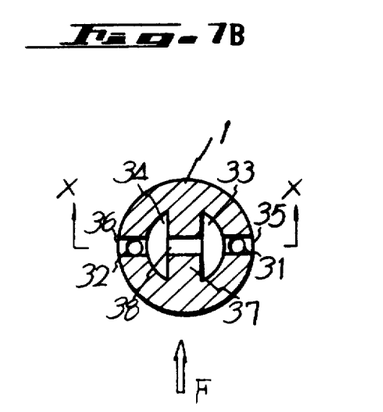
Figure 7C:
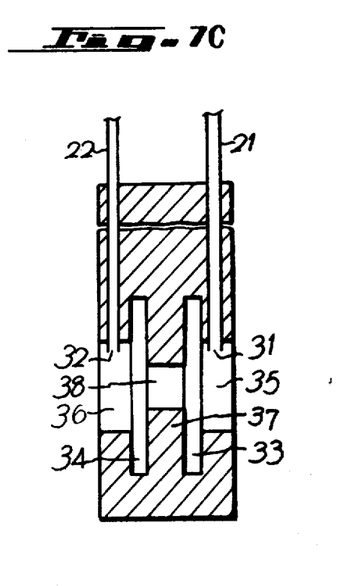

FIGS. 7A, 7B and 7C, show another modified form of the cylindrical object 1. Similar reference numerals to those of FIGS. 6A, 6B and 6C represent similar elements. In this embodiment slits 35 and 36 are bored in the cylindrical object 1 on opposite sides thereof and along its axial direction. These slits correspond to the plurality of openings 35, 36 in the FIG. 6 example. The openings 31, 32 of the ends of tubes 21, 22 open into the slits 35, 36, respectively. The other construction is substantially the same as that of FIG. 6.

When the cylindrical object 1 shown in FIGS. 7A to 7C is immersed in the fluid F, the fluid received into the cavities 33, 34 through the slits 35, 36 is displaced or flows through the slits 35, 36, the cavities 33, 34 and the aperture 38 formed in the partition wall 37. The purge or clean fluid passing through the tubes 21, 22 is ejected from the openings 31, 32 and purges and cleans the slits 35, 36 and passes outside of the cylindrical object 1. The velocity or quantity of the flow of the purge fluid ejected from the openings 31, 32 of the tubes 21, 22 varies proportionally to the variations of the pressure of the fluid in the slits 35, 36 and thus to the number of Karman vortices formed. Consequently, the number of Karman vortices formed can be measured by detecting the variations of the quantity or velocity of the flow of the fluid passing through the tubes 21 and 22 with fluid displacement detecting elements 6 and 6'.

Figure 8A:
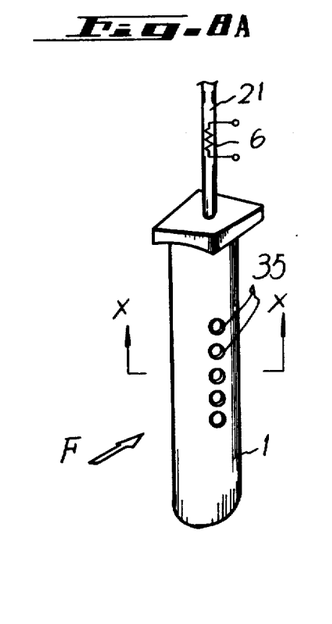
Figure 8B:
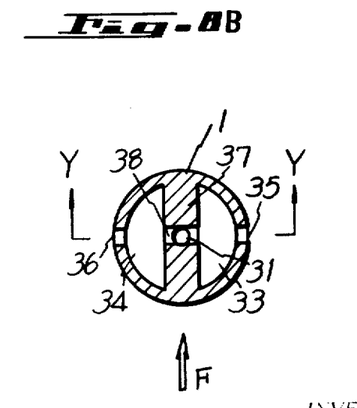
Figure 8C:
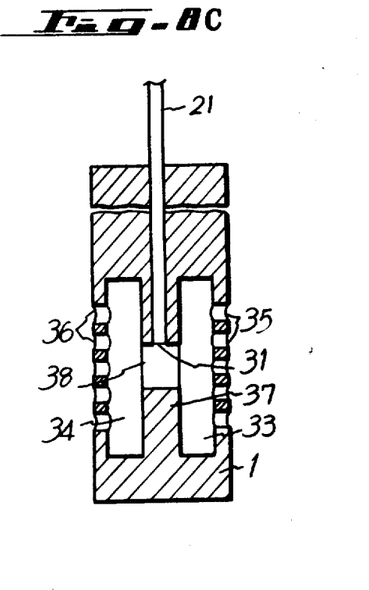

FIGS. 8A, 8B and 8C show another modified form of the cylindrical object 1 in which like reference numerals designate elements corresponding to those in the prior figures. In this example a single pipe 21 is employed for supplying cleaning fluid and its opening 31 opens into aperture 38 of the partition wall 37. The other construction is substantially the same as that of the FIG. 6 example.

When the cylindrical object 1 of FIGS. 8A to 8C is immersed in the fluid F it flows into the cavities 33, 34 through the openings 35, 36 and is displaced or flows through the openings 35, 36, the cavities 33, 34 and the aperture 38 formed in the partition wall 37. The purge fluid from the tube 21 is ejected from the opening 31 and purges the aperture 38, the cavities 33, 34 and the openings 35, 36 and passes to the outside of the cylindrical object 1. The quantity or velocity of the flow of the purge fluid ejected from the opening 31 of the tube 21 varies in response to the pressure variations of the fluid in the aperture 38 which corresponds to the number of Karman vortices formed. Consequently, the number of vortices formed can be measured by detecting the variations of the quantity or flow velocity of the purge fluid flowing through the tube 21 with the detecting element 6.

Figure 9A:
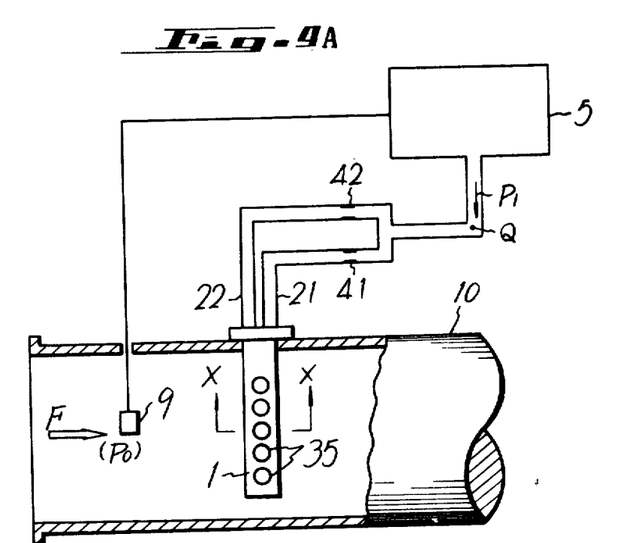
FIG. 9A shows a further modification of the present invention partly cut away.
Figures 9B, 9C:
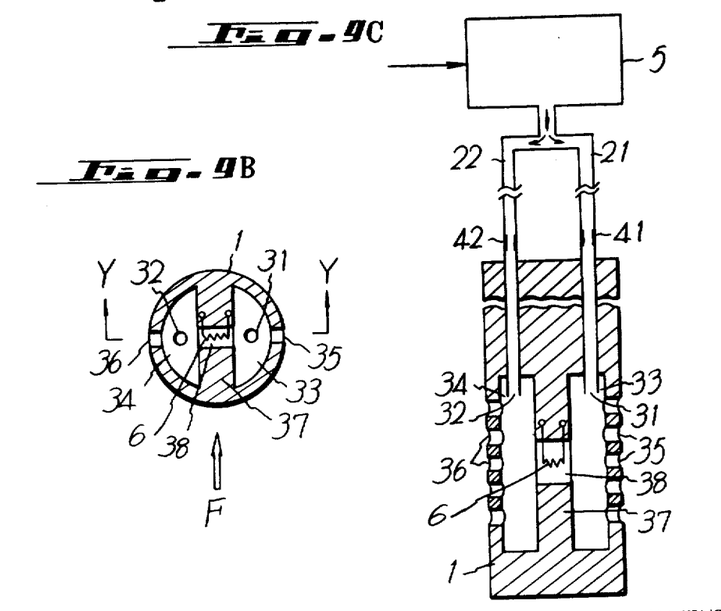
FIG. 9B is a cross-sectional view along the line X—X in FIG. 9A.
FIG. 9C is a cross-sectional view along the line Y—Y in FIG. 9B.

FIGS. 9A, 9B and 9C show another example of the present invention in which reference numerals similar to those of the foregoing examples indicate similar components. The arrangement is substantially the same as that of FIG. 6 except that the fluid displacement detecting element 6 is disposed in the aperture 38 and a static pressure detector 9 of the fluid F is provided in the fluid F flowing through the conduit 10. The output from the static pressure detector 9 is applied to the purge fluid source 5 to control it to maintain the pressure $P_1$ of the purge fluid substantially the same as the pressure $P_0$ of the fluid F to be measured.

With such an arrangement, if the fluid F has a density of $\rho_0$; and its flow velocity $v_0$; and if the output pressure of the purge fluid is $P_1$; its density is $\rho_1$; and the quantity flowing through the tubes 21, 22 is Q; and that the mean pressure of the fluid in the cavities 33, 34 is P, then the following relationships exist:

$$(P_0 - P) = K_0 \rho_0 v_0^2 \quad (1)$$

$$(P_1 - p) = K_1 \rho_1 Q^2 \quad (2)$$

where $K_0$ and $K_1$ are constants.

In the example shown in FIGS. 9A to 9C since the output pressure $P_1$ of the purge fluid from the purge fluid source 5 is controlled so as to be approximately the same as the static pressure $P_0$ of the fluid $F$ to be measured, the following equation (3) is obtained from the equations (1) and (2):

$$K_0 \rho_0 v_0^2 = K_1 \rho_1 Q^2 \quad (3)$$

From the equation (3), the quantity $Q$ of the purge fluid flowing through the tubes may be expressed as:

$$Q = \sqrt{\frac{K_0 \rho_0}{K_1 \rho_1}} \cdot v_0 \quad (4)$$

It will be apparent from equation (4) that the quantity Q is proportional to the velocity $v_0$ of the fluid to be measured.

With the arrangement illustrated in FIGS. 9A to 9C the output pressure $P_1$ of the purge fluid from the purge fluid source 5 is controlled so as to be approximately the same as the static pressure $P_0$ of the fluid to be measured and the restricters 41, 42 are provided in the tubes 21, 22 respectively, so that the quantity Q of the purge fluid flowing through the tubes 21, 22 varies automatically with the variations of the velocity $v_0$ of the flow of the fluid F to be measured. Consequently, even if the velocity of the flow of the fluid F to be measured varies within a comparatively wide range, the purge fluid can be effectively ejected to the cavities 33, 34 and the openings 35, 36. When the velocity $v_0$ of the flow of the fluid F to be measured is comparatively low, the energy in the vortices produced in the fluid by the cylindrical object 1 is small and tends to be disturbed. In such case the quantity of flow of the purge fluid will be automatically decreased, so that the purge fluid does not disturb the formation of vortices. In the case where the velocity $v_0$ of the fluid F to be measured is rather high, the pressure difference between the opposite sides of the cylindrical object becomes great due to the formation or separation of the vortices and increases the displacement or flow of the fluid F near the cavities 33, 34 or the aperture 38. However, this causes the quantity Q of the purge fluid to be automatically increased so that dust and/or particles are prevented from entering into cavities 33, 34 and from outside the cylindrical object 1. If they do enter they are repelled.

The variations of flow through the aperture 38 corresponds immediately to the pressure P of the fluid F in the cavities 33, 34 and the pressure P to the formation or separation of the vortices by the cylindrical object 1, so that signals corresponding to the number of Karman vortices formed can be obtained with the fluid displacement detecting element 6 provided in the aperture 38.

Figure 10A:
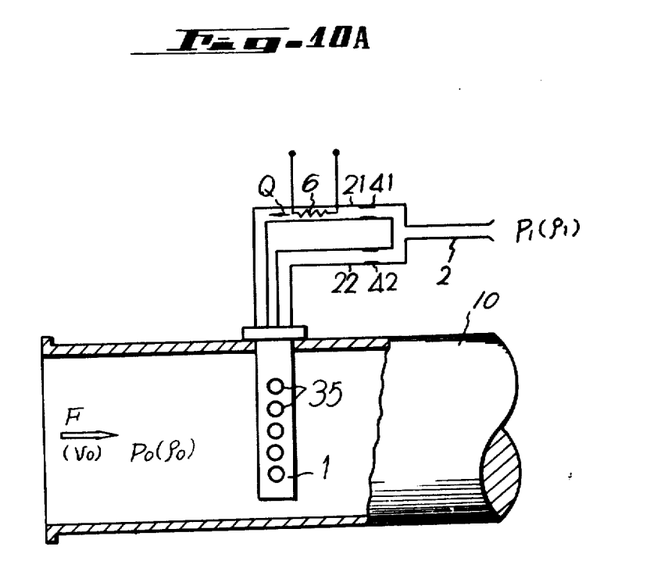
FIG. 10A shows a still further example of the present invention partly cut away.
Figure 10B:
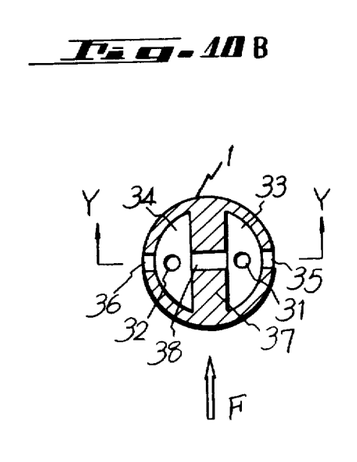
FIG. 10B is a cross-sectional view along the line X—X in FIG. 10A.
Figure 10C:
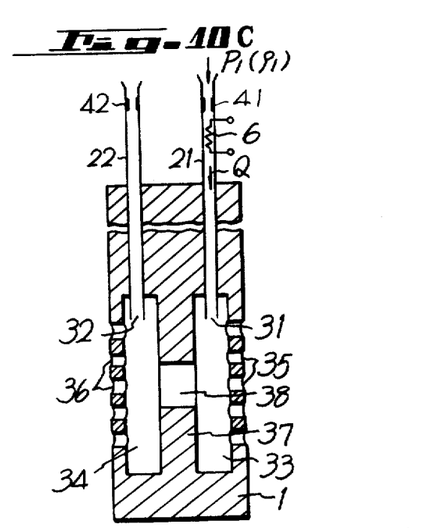
FIG. 10C is a cross-sectional view along the line Y—Y in FIG. 10B.

FIGS. 10A, 10B and 10C illustrate another modified form of the present invention in which reference numerals similar to those of the foregoing examples indicate similar components.

In this example the tubes 21, 22 which have mounted therein the restricters 41, 42 are connected by a common portion which is opened to the atmosphere. The fluid displacement detecting element 6 is mounted in tube 21. The other constructional features are substantially the same as that shown in FIGS. 9A to 9C except the detector 9 is not used. That is, in this example the purge fluid source 5 which is used in the FIG. 9 example is dispensed with and the atmosphere is used as the purge fluid. The element 6 is disposed in the tube 21 instead of being mounted in the aperture 38 of the FIG. 9 example.

The arrangement illustrated in FIGS. 10A to 10C can be employed with good results where the static pressure of the fluid F to be measured is lower than or about equal to that of the atmosphere.

If the static pressure of the fluid F to be measured is $P_0$; its density is $\rho_0$; the velocity of the flow is $v_0$; the pressure of the atmosphere is $P_1$; the density of the atmosphere is $\rho_1$; the quantity of the flow of the purge fluid flowing through the tubes is Q; and the mean pressure of the fluid in the cavities is P, the following equations (5), (6) are obtained:

$$(P_0 - P) = K_0 \rho v_0^2 \quad (5)$$

$$(P_1 - P) = K_1 \rho_1 Q^2 \quad (6)$$

where $K_0$ and $K_1$ are constants.

In the event that $P_1$ equals $P_0$, which is when the static pressure $P_0$ of the fluid F is equal to the atmospheric pressure $P_1$, then the following equation (7) is obtained from the equations (5) and (6):

$$K_0 \rho_0 v_0^2 = K_1 \rho_1 Q^2 \quad (7)$$

Therefore, the quantity of the flow of the purge fluid flowing through the tubes is expressed as follows:

$$Q = \sqrt{\frac{K_0 \rho K_0}{K_1 \rho K_1}} \cdot v_0$$

$$= K \cdot v_0 \quad (8)$$

where K is a constant and is equal to $$\sqrt{\frac{K_0 \rho_0}{K_1 \rho_1}}$$

It is apparent from equation (8) that the quantity Q of the flow of the purge fluid is proportional to the velocity $v_0$ of the flow of the fluid F to be measured.

The operation and advantage attained by this example are substantially the same as those obtained by the example shown in FIGS. 9A to 9C, and thus will not be repeated.

The element 6 may be placed in the aperture 38 as in the case of the FIG. 9 example if desired.

Figure 11:
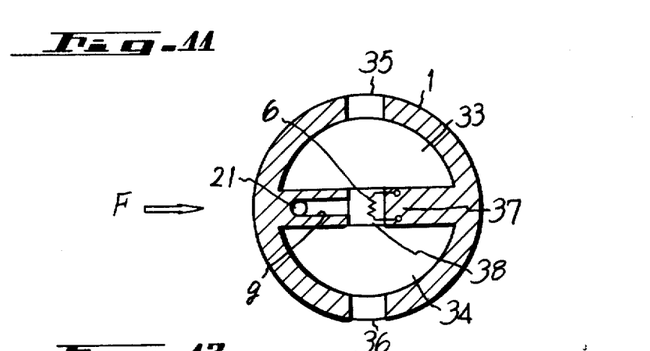
FIGS. 11 to 13, inclusive are cross-sectional views for illustrating modifications of the cylindrical object usable in the present invention similar to that, for example, FIG. 10B.
Figure 12:
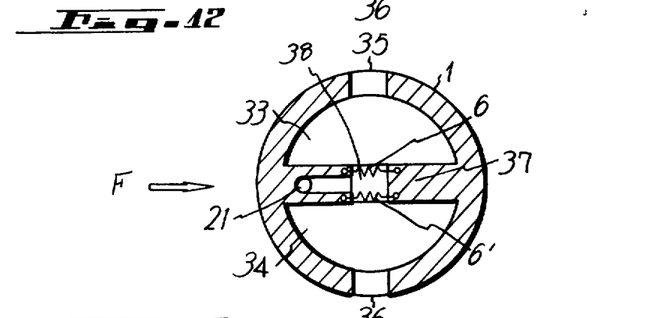
Figure 13:
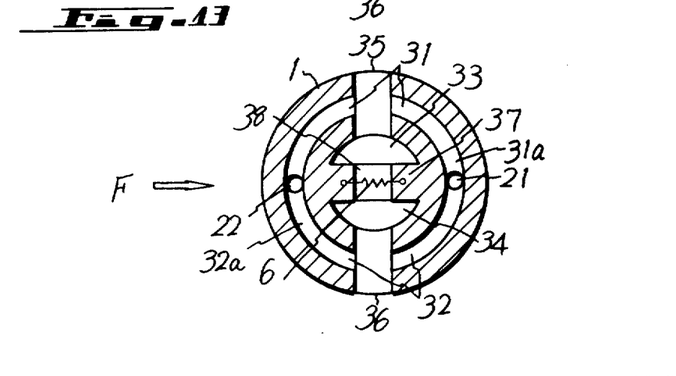

FIGS. 11 to 13 respectively show other examples of the cylindrical object 1 employed in the present invention in which reference numerals similar to those in the foregoing examples indicate similar components.

The embodiment of FIG. 11 has a groove or hole g formed in its partition wall 37. The free end portion or opening of the single tube 21 which permits passage of the purge fluid ends in the groove or hole g, so that purge fluid flows through the hole g to the aperture 38 and purges the hole g and the bore 38. The fluid displacement detecting element 6 is disposed in the aperture 38 in this example.

The modification shown in FIG. 12 is substantially the same as that of FIG. 11 except that two fluid displacements detecting elements 6 and 6' are disposed in the aperture 38 instead of a single detecting element 6.

In FIG. 13, two tubes 21 and 22 which carry the purge fluid are employed and their ends are opened into two semi-circular grooves 31a and 32a formed in the cylindrical object 1. The free ends of each of the semi-circular grooves 31a and 32a are opened at the openings 35 and 36 respectively, so that the purge fluid emitted from the openings of the tubes 21, 22 purge the portions near the openings 35, 36.

The foregoing explanation relates to the case where one or both ends of the tube or tubes are open to the atmosphere or receive a specific purge fluid but it is also possible that the end or ends may be supplied pure water which may serve as the purge fluid. In such arrangement the specific purge fluid source 5 can be dispensed with. Also, mean pressure in the cavities 33, 34 will be automatically decreased with an increase of the flow velocity in the cavities, so that the quantity of flow of the purge fluid will be controlled by the velocity of the fluid to be measured and will always effectively purge and clean the cylindrical object 1.

It is preferred to employ a hot wire, thermistor, resistor for temperature measurement, or thermocouple, as the displacement detecting element which has a temperature variation caused from cooling of the flowing fluid. It is not always necessary to employ an object with circular cross-section as objects with elliptical or rectangular cross-sections can be used.

Since the purging and cleaning of the cylindrical object as well as the cavities, the openings, apertures, and the like can be accomplished with uncontaminated fluid and since the fluid displacement detecting element is disposed in the tube through which the pure purge fluid flows, the number of Karman vortices formed can be accurately measured and with the simple device even if the fluid to be measured is contaminated. Also, the fluid displacement detecting element can be easily repaired or exchanged if mounted outside the member.

It will be apparent that many modifications and variations may be effected without departing from the scope of the novel concepts of the present invention.

We claim as our invention:

1. A flow meter comprising:
   a cylindrical object immersed in fluid whose velocity is to be measured and producing Karman vortices therein;
   a purge fluid reservoir;
   purge fluid conduit means connected to said reservoir and extending into said cylindrical object and terminating in openings on opposite side surfaces of said cylindrical object, said openings being formed to be substantially perpendicular to the flow direction of said fluid, said purge fluid conduit means conducting purge fluid from said purge fluid reservoir to flow out of said openings of said cylindrical object, the pressure of said purge fluid in said reservoir being greater than the static pressure of said fluid surrounding said cylindrical object; and
   velocity detecting means mounted in said purge fluid conduit means and detecting the variations of velocity of said purge fluid in said purge fluid conduit means which is indicative of the flow velocity of said fluid.

2. A flow meter as claimed in claim 1 wherein said purge fluid conduit means comprises a pair of tubes which extend into said cylindrical object and are joined together and connected to said reservoir through a common conduit and said velocity detecting means is mounted in one of said tubes.

3. A flow meter as claimed in claim 1 wherein openings in said cylindrical object are a plurality of openings on each side thereof aligned in its axial direction.

4. A flow meter as claimed in claim 1 wherein said openings in said cylindrical object are a pair of slits on each side thereof and extending in the longitudinal direction of said cylindrical object.

5. A flow meter as claimed in claim 1 in which said purge fluid conduit means have restrictors mounted therein.

6. A flow meter as claimed in claim 1 in which said purge fluid is air.

7. A flow meter as claimed in claim 1 in which said purge fluid is a liquid and the pressure of said liquid is approximately equal to atmospheric pressure.

8. A flow meter comprising:
   a cylindrical object to be immersed in fluid whose velocity is to be measured and producing Karman vortices in said fluid;
   a purge fluid reservoir;
   purge fluid in said reservoir;
   at least two openings formed in said cylindrical object on opposite sides thereof and said openings formed to be substantially perpendicular to the flow direction of said fluid;
   a pair of cavities formed in said cylindrical object on opposite sides thereof and said two openings communicating therewith;
   a partition wall between said cavities;
   an aperture formed in said partition wall;
   a pair of tubes connected to said reservoir and respectively communicating with said cavities;
   purge fluid supplied to said tubes which passes through said aperture and the pressure of said purge fluid in said reservoir being greater than the static pressure of said fluid surrounding said cylindrical object; and
   velocity detecting means for measuring the flow of said purge fluid.

9. A flow meter as claimed in claim 8 wherein said velocity detecting means is mounted in one of said tubes for detecting the variations of velocity of said purge fluid.

10. A flow meter as claimed in claim 8 wherein said velocity detecting means is mounted in said aperture.

11. A flow meter comprising:
    a cylindrical object to be immersed in fluid whose velocity is to be measured and for producing Karman vortices in said fluid;
    a purge fluid reservoir for supplying purge fluid to purge said cylindrical object, the pressure of the purge fluid in said reservoir being greater than the static pressure of said fluid surrounding said cylindrical object;
    a pipe with one end connected to said purge fluid reservoir and feeding said purge fluid out of an opening in said cylindrical object to purge at least one side surface of said cylindrical object and said opening formed to be substantially perpendicular to the flow direction of said fluid; and
    a fluid displacement detecting element mounted in said pipe means for detecting the variations of velocity of said purge fluid.

12. A flow meter as claimed in claim 11 in which said cylindrical object has provided therein a plurality of axially aligned openings adjacent said openings on at least one side surface thereof and said plurality of openings formed to be substantially perpendicular to the flow direction of said fluid.

13. A flow meter as claimed in claim 12 wherein said opening in said cylindrical object is a slit extending in the axial direction and formed to be substantially perpendicular to the flow direction of said fluid.

14. A flow meter as claimed in claim 11 in which said cylindrical object has formed therein two cavities, a partition wall between said cavities, an aperture formed in said partition wall, and said opening comprises a pair of groups of aligned openings in the wall of said cylindrical object on opposite sides thereof and formed to be substantially perpendicular to the flow direction of said fluid, said group of openings of one side communicating with the group of openings on the other side through said cavities and said aperture and said pipe feeding purge fluid into one of said openings, cavities or aperture so that it flows out of said groups of aligned openings.

15. A flow meter as claimed in claim 14 in which said fluid displacement detecting element is mounted in said aperture.

* * * * *

UNITED STATES PATENT OFFICE
CERTIFICATE OF CORRECTION

Patent No. 3,691,830          Dated September 19, 1972

Inventor(s) Tomota et al

It is certified that error appears in the above-identified patent and that said Letters Patent are hereby corrected as shown below:

Column 6, equation (3), rewrite to read as follows:

$$K_0 \rho_0 \dot{v}_0^2 = K_1 \rho_1 Q^2 \qquad (3)$$

Column 8, equation (5), rewrite to read as follows:

$$(P_0 - P) = K_0 \rho_0 v_0^2 \qquad (5)$$

Column 8, equation (8), rewrite to read as follows:

$$Q = \frac{K_0 \rho_0}{K_1 \rho_1} \cdot v_0$$
$$= K \cdot v_0 \qquad (8)$$

Signed and sealed this 9th day of July 1974.

(SEAL)
Attest:

McCOY M. GIBSON, JR.
Attesting Officer

C. MARSHALL DANN
Commissioner of Patents